United States Patent [19]

Fujimoto

[11] Patent Number: 4,698,386

[45] Date of Patent: Oct. 6, 1987

[54] POLYORGANOSILOXANE COMPOSITIONS

[75] Inventor: Tetsuo Fujimoto, Ohta, Japan

[73] Assignee: Toshiba Silicone Company, Ltd., Japan

[21] Appl. No.: 868,228

[22] Filed: May 28, 1986

[30] Foreign Application Priority Data

Aug. 26, 1985 [JP] Japan .............................. 60-185822

[51] Int. Cl.$^4$ .............................................. C08L 83/04
[52] U.S. Cl. .................................... 524/862; 524/159; 524/186; 524/190; 524/236; 524/588; 524/722; 524/861; 528/15; 528/31; 528/32; 525/478
[58] Field of Search ............... 524/861, 862, 190, 159, 524/186, 236, 588, 722; 568/15, 31, 32; 525/478

[56] References Cited

U.S. PATENT DOCUMENTS 3,458,469  7/1969  Murphy ................................ 524/861

*Primary Examiner*—Melvyn I. Marquis

[57] ABSTRACT

Polyorganosiloxane compositions comprising:
(A) a linear and/or branched polyorganosiloxane, with a viscosity of 50 to 100,000 cP at 25° C., wherein 0.7 to 1.8 vinyl radicals bonded to silicon atoms, on average, are present in each molecule, and the remaining organic radicals bonded to silicon atoms are substituted or unsubstituted monovalent hydrocarbon radicals which does not include unsaturated aliphatic radicals, and 30% or more portion of the molecules has only one silicon-bonded vinyl radical in the molecule;
(B) a polyorganohydrogensiloxane, wherein more than two hydrogen atoms bonded to silicon atoms, on average, are present in each molecule, in an amount such that the number of silicon-bonded hydrogen atoms may be 0.5 to 5 per vinyl radical in the molecule (A);
(C) a catalytic amount of platinum compounds; and
(D) anthraquinone dyes and/or azo dyes, in an amount from 1 to 2,000 ppm to (A).

12 Claims, No Drawings

POLYORGANOSILOXANE COMPOSITIONS

The present application claims priority of Japanese patent application serial No. 85/185822 filed Aug. 26, 1985.

BACKGROUND OF THE INVENTION

The present invention relates to polyorganosiloxane compounds, and more particularly to polyorganosiloxane compounds which give a gellike substance capable of indicating the state of curing by change of color and having excellent adhesion to substrates such as plastics, metal, etc.

Conventionally, compositions which are curable to a gelllike polyorganosiloxane have been widely used, for example, for potting in manufacturing electric or electronic apparatus, for encapsulation or as an embedding material in surgical operations, by virtue of such a nature. (Refer to Japanese Patent Publication No. 17847/1973).

Such compositions do not harden as completely as, for example, a thermosetting resin does, but retain a gellike state with high adhesiveness even after completion of the curing reaction. Accordingly, in measuring the curing state of such a substance, it was impossible to measure the curing state through finger touch, which is the ordinary method for measuring the curing state. Therefore, there has conventionally been employed a method of measuring curing by means of cone penetration test.

However, it is not only extremely difficult but inefficient to conduct a penetration test to evaluate the curing state every time it is required in actual manufacturing processes. Therefore, evaluation of the curing state largely depends on the experience of operators present, thereby causing various problems such as breakage and failure of the gel due to their misjudgment of the curing state and further causing lowering of working efficiency, etc.

SUMMARY OF THE INVENTION

The present invention overcomes the above disadvantages and provides polyorganosiloxane compositions wherein visual evaluation of the curing state of a material is possible by the change of color thereof and which compositions give a gellike substance having excellent adhesiveness to substrates such as plastics, metal, etc.

The present inventor has extensively studied to overcome such disadvantages, and as a result, has found that a polyorganosiloxane composition, wherein visual evaluation of the curing state is possible by the change of color or fading out of color as curing thereof processes, can be obtained by adding anthraquinone dyes and/or azo dyes to a silicone gel composition which cures by the reaction of hydrosilyl radicals with vinyl radicals bonded to silicon atoms.

DESCRIPTION OF THE INVENTION

The polyorganosiloxane compositions according to the present invention comprise:

(A) a linear and/or branched polyorganosiloxane, with a viscosity of 50 to 100,000 cP at 25° C., wherein 0.7 to 1.8 vinyl radicals bonded to silicon atoms, on average, are present in each molecule and the remaining organic radicals bonded to silicon atoms are substituted or unsubstituted monovalent hydrocarbon radicals which does not include unsaturated aliphatic radicals, and 30% or more portion of the molecules has only one silicon-bonded vinyl radical in the molecule;

(B) a polyorganohydrogensiloxane, wherein more than two hydrogen atoms bonded to silicon atoms, on average, are present in each molecule, in an amount such that the number of the hydrogen atoms bonded to silicon atoms may be 0.5 to 5 per vinyl radical bonded to the silicon atoms contained in (A);

(C) a catalytic amount of platinum compounds; and (D) anthraquinone dyes and/or azo dyes, in an amount from 1 to 2,000 ppm relative to (A).

The polyorganosiloxane of component (A) to be used in the present invention has 0.7 to 1.8, on average, and preferably 0.75 to 1.4 vinyl radicals bonded to silicon atoms in a molecule. In the case where the number of vinyl radicals is less than 0.7, the portion of polyorganosiloxane which does not participate in crosslinking increases to lower remarkably the mechanical property of the gellike substance to be obtained after curing and adhesiveness thereof to a substrate; whereas in the case where the number of vinyl radicals is more than 1.8, the characteristics of the present invention to give a soft gellike substance without any residual vinyl radical may not be exhibited. It is also necessary that 30% or more of the molecules of polyorganosiloxane (A) should be monovinylpolyorganosiloxane. In the case where the molecular proportion of the monovinylpolyorganosiloxane is less than 30%, a gellike substance having favorable adhesives, which is one of the characteristics of the present invention, may not be obtained. While there may be obtained a gellike substance having adhesiveness to some extent even if the molecular proportion of the monovinylpolyorganosiloxane is 100%, however, in such a case, there may merely be formed a polymer which is extremely branched by the reaction with component (B). Moreover, it does not form a chemically crosslinked structure but two dimensional intermolecular entanglement to give a gellike substance having extremely high viscosity, which starts to flow after a while when left to stand. Accordingly, in order to maintain adequate form retention, as well as softness, it is preferred that the proportion of monovinylpolyorganosiloxane to be contained in the polyorganosiloxane is 40 to 85% in terms of molecules and that a small percentage of polyorganosiloxane having two or more vinyl radicals bonded to silicon atoms is present therein.

Of the organic radicals which are bonded to the silicon atoms contained in polyorganosiloxane (A), those other than the above-mentioned vinyl radical are exemplified by an alkyl radical such as methyl, radical, ethyl radical, propyl radical, butyl radical, amyl radical, hexyl radical, octyl radical, decyl radical and dodecyl radical; an aryl radical such as phenyl radical; an aralkyl radical such as $\beta$-phenylethyl radical and $\beta$-phenylpropyl radical; and a substituted hydrocarbon radical such as chloromethyl radical, cyanoethyl radical and 3,3,3-trifluoropropyl radical. However, because of ease of synthesis and handling in an unreacted state and of the favorable heat resistance and mechanical property of the resulting gellike substance, methyl radicals are preferred. Further, it is desirable to introduce up to 8 mole % of phenyl radicals into the organic radicals in the case where low temperature resistance is required, and up to 50 mole % of phenyl radicals into the organic radicals in the case where especially high temperature resistance, radiation resistance or a high refractive index is required. Viscosity at 25° C. may be selected from the range between 50 and 100,000 cP, preferably 300 and 5,000 cP. When the composition is used for potting, the most preferable viscosity of (A) is in the range from 500 to 1,500 cP. In the case where the viscosity of (A) is lower than 50 cP, the composition before cure is much too flowable and gives poor physical properties to the cured gellike substance; whereas in the case where the viscosity of (A) is more than 100,000 cP, processability before cure is poor.

Polyorganosiloxane (A) may be of linear or branched structure, or a mixture of both. However, because of ease of synthesis and of the adequate softness to be given to a resulting gellike substance, substantially linear structure is preferred. The composition is allowed to have a small amount of cyclic polyorganosiloxanes. However, even with silicon-bonded vinyl radicals the cyclic polyorganosiloxanes do not contribute to the formation of adherent gellike substance. Vinyl radicals could be attached to any silicon atoms in the polyorganosiloxane molecule, however, the silicon atoms at chain ends are desirable in order to form a gellike substance fast and effectively.

Polyorganosiloxane (A) can be synthesized, for example, by mixing a vinyl radical containing polyorganosiloxane which contains vinyl radicals bonded to terminal silicon atoms at both ends with a linear or branched polyorganosiloxane containing no vinyl radical, and if necessary, with cyclic polydiorganosiloxanes containing no vinyl radical, in an amount to satisfy the average molecular weight for meeting the viscosity range and the vinyl radical content as mentioned above, followed by an ordinary method such as cleavage or equilibration of siloxane chains in the presence of either an acid catalyst such as sulfuric acid, hydrochloric acid, activated clay etc. or an alkaline catalyst such as potassium hydroxide, tetramethylammonium hydroxide, etc. In such an instance, there may be used cyclic polysiloxanes, particularly those having no vinyl radicals as part of the starting materials. After equilibrium, the mixture is purified by removing the catalyst through an ordinary method and removing the side-produced or unreacted low molecular weight polyorganosiloxanes with heating under reduced pressure. In this procedure, (A) may be obtained as a mixture comprising monovinylpolyorganosiloxane as a main constitutent and polyorganosiloxane having two or more vinyl radicals bonded to silicon atoms, by selecting a suitable formulation of the polysiloxanes and equilibration conditions.

Polyorganohydrogensiloxane (B) to be used in the present invention forms a gellike substance by reaction with the vinyl radicals contained in polyorganosiloxane (A). More than two hydrogen atoms bonded to silicon atoms must be present on an average in the polyorganohydrogensiloxane (B) in order to form a loose network by reaction with the polyorganosiloxane containing two or more vinyl radicals bonded to silicon atoms contained in (A). Such hydrogen atoms may be bonded to either the terminal or the intermediate silicon atoms in a molecular chain. The organic radicals bonded to the silicon atoms contained in (B) are exemplified by the same radicals described as the organic radicals bonded to the silicon atoms contained in (A) other than vinyl radicals, among these, methyl radicals are preferred because of ease of synthesis. While the structure of the siloxane may either be straight chain or branched, it is preferred to be of straight structure because of ease of synthesis and the favorable mechanical properties given to the resulting gellike substance. The viscosity of component (B) is not particularly limited, however, because of ease of handling and synthesis, it is preferred to be in the range from 10 to 10,000 cP at 25° C.

Component (B) is mixed in an amount such that the hydrogen atoms bonded to the silicon atoms contained in component (B) may be 0.5 to 5, preferably 0.8 to 1.8, per vinyl radical bonded to a silicon atom contained in component (A). In the case where the amount of the hydrogen atoms bonded to the silicon atoms is too small, crosslinking may not proceed sufficiently and the resulting gellike substance may be too soft. In the case where the amount of hydrogen atoms is too large, the resulting gellike substance may also be too soft.

The platinum compounds of component (C) to be used in the present invention are catalysts to accelerate the addition reaction between the vinyl radicals contained in component (A) and the hydrosilyl radicals contained in component (B), and is exemplified by chloroplatinic acid, complexes obtained by the reaction of chloroplatinic acid with an alcohol, olefin or a polyorganosiloxane containing vinyl radicals, platinum coordination compounds, etc. The amount of component (C) is such that needed to initiate the foregoing reaction, and 1 to 100 ppm as elemental Pt to component (A) is preferrable.

It is most desirable that the anthraquinone dyes and/or azo dyes of component (D) to be used in the present invention are soluble in the polyorganosiloxane of component (A) or component (B). However, since such dyes can be used dissolved in organic solvents such as toluene and dispersed in the polyorganosiloxane composition, they may be any such dye which is soluble in an organic solvent. It is also possible to use dyes which are insoluble in component (A) or (B), because the effect of the present invention will not be lost even by dispersing such dyes to the polyorganosiloxane composition through mixing. The following dyes are applicable in this invention. The antraquinone dyes are exemplified by KAYASET BLUE 814 (tradename, produced by Nippon Kayaku Co.), ORIENTAL OIL BLUE K (tradename, produced by Toyo Ink Mfg. Co.), ORIENT OIL VIOLET No. 730 (tradename produced by Orient Chemical Industries), SUMIPLAST BLUE CA (tradename, produced by Sumitomo Chemical Industry) etc. The azo dyes are exemplified by monoazo- or polyazo dyes, metal complex azo dyes, pyrazolone azo dyes, stilbene azo dyes, thiazole azo dyes etc. However, bisazo dyes having two azo (—N=N—) radicals are most preferred in order to exert the effect of the present invention sufficiently. The bisazo dyes are exemplified by ORIENT OIL RED 5B (tradename, produced by Orient Chemical Industries), KAYASET RED 802 (tradename, produced by Nippon Kayaku Co.), OIL RED SA EXTRA (tradename, produced by Hakudo Kagaku Kenyusho) etc. As component (D), there may be used either anthraquinone dyes or azo dyes individually or a combination of both.

Component (D) is used in an amount ranging from 1 to 2,000 ppm relative to component (A). In the case where the amount is less than 1 ppm, the effect of the present invention may not sufficiently be exhibited; whereas in the case where it exceeds 2,000 ppm, change in color is sometimes weak to recognize.

When transparency is not required to a gellike substance to be obtained, there may be mixed an inorganic filler, as necessity demands, to the composition of the present invention to control processability, hardness after curing, mechanical strength etc. Such inorganic fillers are exemplified by fumed silica, silica aerogel, precipitated silica, ground quartz powder, diatomaceous earth, zinc oxide, calcium carbonate, magnesium carbonate, zinc carbonate etc. However, use of fillers having their own original color or big hiding power such as titanium oxide, iron oxide etc. is not appropriate for the above purpose. Further, known reaction inhibitor may be added to the present composition.

While the addition reaction type silicone gel may cure just by leaving it to stand at normal temperature, it is also possible to accelerate curing by heating. In the polyorganosiloxane composition of the present invention, a change of color or fading out of color as the gel cures, even in heat curing, can clearly be seen by visual observation.

In ordinary addition cured silicone gel compositions, a cured gellike substance is obtained by mixing a package comprising a polyorganosiloxane having vinyl radicals and a platinum compound and a catalyst with appropriate amount of package comprising a polyorganohydrogensiloxane having hydrogen atoms bonded to silicon atoms. In the silicone gel composition of the present invention, the mixing state is observed visually by coloring either one or both of these polysiloxane components with anthraquinone dyes and/or azo dyes. Furthermore, the curing state is recognized by change in color. Thus, the present invention is of great value in industry.

EXAMPLES OF THE INVENTION

The present invention will be illustrated below by referring to the Examples. In the Synthesis Examples and the Examples, part(s) means part(s) by weight.

SYNTHESIS EXAMPLE 1

To a reaction flask equipped with a stirrer, a thermometer and a reflux condenser were charged 14.2 parts of hexamethyldisiloxane, 135 parts of $\alpha,\omega$-divinylpolydimethylsiloxane with a polymerization degree of 20; 2,430 parts of octamethylcyclotetrasiloxane and 25.7 parts of activated clay, which had preliminarily been dried at 150° C. for 24 hours and kept in a state wherein moisture was excluded, and the resulting mixture was heated at 70° C. for 4 hours to effect equilibration reaction. After completion of the reaction, the reaction mixture was cooled down, and the activated clay was removed by filtration. Subsequently, when the reaction mixture was heated in a pressure-reduced simple distillation device equipped with a stirrer for 2 hours at 140° C. under a pressure of 20 Torr to remove the low molecular weight polysiloxanes, there was obtained 2,320 parts of polyorganosiloxane mixture (B-1) with a viscosity of 1,000 cP at 25° C.

SYNTHESIS EXAMPLE 2

Using the same apparatus as in Synthesis Example 1, there were charged 6.6 parts of hexamethyldisiloxane, 62 parts of $\alpha,\omega$-divinylpolydimethylsiloxane with a polymerization degree of 20; 2,356 parts of octamethylcyclotetrasiloxane and the same dry activated clay as used in Synthesis Example 1. Subsequently, equilibration reaction, filtration and removal of low molecular weight polysiloxane were conducted analogously to Synthesis Example 1 to obtain 2,170 parts of a polyorganosiloxane mixture (B-2) with a viscosity of 3,500 cP at 25° C.

SYNTHESIS EXAMPLE 3

To a reaction apparatus were charged 1,350 parts of $\alpha,\omega$-divinylpolydiorganosiloxane with a viscosity of 4,100 cP at 25° C., endblocked by dimethylvinylsilyl radicals, wherein 28 mole % of the organic radicals bonded to silicon atoms are phenyl radicals and the rest are methyl radicals and 150 parts of $\alpha,\omega$-dimethyl-polydiorganosiloxane with a viscosity of 170 cP at 25° C., end-blocked by trimethylsilyl radicals, wherein 28 mole % of organic radicals bonded to silicon atoms are phenyl radicals and the rest are methyl radicals, and after 1 part of potassium hydroxide was added thereto, the resulting mixture was heated at 150° C. for 7 hours with stirring to effect equilibration reaction. After completion of the reaction, the reaction mixture was left to cool down, and 2 parts of phosphoric acid were added to neutralize the mixture. Subsequently, when the reaction mixture was heated up to 160° C. under 10 Torr to remove the low molecular weight siloxane, there was obtained 1,290 parts of a colorless transparent polyorganosiloxane mixture (B-3) with a viscosity of 1,600 cP at 25° C.

EXAMPLE 1

Component S-1(a) was prepared by mixing the following materials; 0.05 parts of a substance obtained by heating chloroplatinic acid and tetramethyltetravinyl-cyclotetrasiloxane (platinun content: 1.0% by weight), 100 parts of B-1 obtained in Synthesis Example 1.

Component S-1(b) colored blue was prepared by adding and stirring 0.2 parts of KAYASET BLUE 814 (tradename, produced by Nippon Kayaku Co.) to 100 parts of linear polymethylhydrogensiloxane with a viscosity of 50 cP at 25° C., endblocked by trimethylsilyl radicals and containing 0.88% by weight of hydrogen atoms bonded in silicon atoms.

To 100 parts of S-1(a) was added 0.7 parts of S-1(b), and the resulting mixture turned blue homogeneously upon stirring. Thus, adequacy of the stirring was visually evaluated clearly. When the mixture was further left to stand in an atmosphere of 25° C. or 60° C., respectively, to effect curing, the color of blue disappeared as it is gelled as shown in Table 1, and the degree of curing was clearly evaluated by the change of color.

TABLE 1

| Time after stirring (minutes) | (in an atmosphere of 25° C.) | | | | | | (in an atmosphere of 60° C.) | | | |
| --- | --- | --- | --- | --- | --- | --- | --- | --- | --- | --- |
| | 120 | 360 | 420 | 450 | 480 | 600 | 10 | 40 | 60 | 75 | 120 |
| Cone penetration ASTM D-1403 | not measurable | not measurable | 180 | 105 | 89 | 89 | not measurable | 165 | 100 | 89 | 89 |
| Observation by finger touch | — | — | tacky | tacky | tacky | tacky | — | tacky | tacky | tacky | tacky |
| Color change | blue | blue | pale blue | slightly blue | blue disappeared | blue disappeared | blue | pale blue | slightly blue | blue disappeared | blue disappeared |

EXAMPLE 2

A blue composition S-2 was prepared by mixing the following materials uniformly; 100 parts of B-2 obtained in Synthesis Example 2, 0.5 parts of linear polymethylhydrogensiloxane with a viscosity of 70 cP at 25° C., enblocked by trimethylsilyl radicals and containing 0.80 % by weight of hydrogen atoms bonded to silicon atoms, 20 ppm of platinum based on the weight of B-2 as an isopropyl alcohol solution of chloroplatinic acid, and 70 ppm of ORIENTAL OIL BLUE K based on the weight of B-2 as a toluene solution of the dye. When the thus obtained dispersion was left to stand in an atmosphere of 25° C., the color thereof turned to green as the gel cured as shown in Table 2, and degree of curing was evaluated. When the composition was tested for adhesiveness to substrates of aluminum, nickel, epoxy resin and phenol resin, rate of cohesive failure was proved to be 100% in each case.

TABLE 2

| | (in an atmosphere of 25° C.) | | | | |
|---|---|---|---|---|---|
| Time after stirring (minutes) | 120 | 140 | 270 | 300 | 420 |
| Cone Penetration ASTM D-1403 | not measurable | 150 | 100 | 86 | 86 |
| Observation by finger touch | — | tacky | tacky | tacky | tacky |
| Color change | blue | blue | bluish green | green | green |

EXAMPLE 3

Component S-3(a) was prepared by adding and stirring 20 ppm of platinum based on the weight of B-1 as an isopropyl alcohol solution of chloroplatinic acid to 100 parts of B-1 obtained in Synthesis Example 1.

Component S-3(b) colored red was prepared by adding and stirring 0.15 parts by weight of KAYASET RED 802 (tradename, produced by Nippon Kayaku Co.), to 100 parts of linear polymethylhydrogensiloxane with a viscosity of 60 cP at 25° C., enblocked by trimethylsilyl radicals and containing 0.90% by weight of hydrogen atoms bonded to silicon atoms.

To 100 parts of S-3(a) was added 0.8 parts of component S-3(b), and the resulting mixture turned red homogeneously upon stirring. Thus, adequacy of the stirring was visually evaluated clearly. When the mixture was left to stand in an atmosphere of 25° C. or 80° C., respectively, to effect curing, the color thereof turned from red to yellow as it gelled as shown in Table 3, and the degree of curing was clearly evaluated by the change in color.

TABLE 3

| | (in an atmosphere of 25° C.) | | | | | |
|---|---|---|---|---|---|---|
| Time after stirring (minutes) | 120 | 360 | 440 | 470 | 500 | 800 |
| Cone penetration ASTM D-1403 | not measurable | not measurable | 175 | 98 | 85 | 85 |
| Observation by finger touch | — | — | tacky | tacky | tacky | tacky |
| Color change | red | red | red | orange | yellow | yellow |

| | (in an atmosphere of 80° C.) | | | | |
|---|---|---|---|---|---|
| Time after stirring (minutes) | 10 | 30 | 45 | 60 | 120 |
| Cone penetration ASTM D-1403 | not measurable | 120 | 95 | 85 | 85 |
| Observation by finger touch | — | tacky | tacky | tacky | tacky |
| Color change | red | orange | orange | yellow | yellow |

EXAMPLE 4

Red composition S-4 was prepared by mixing the following materials uniformly; 100 parts of B-3 obtained in Synthesis Example 3, 1.4 parts of linear polymethylhydrogensiloxane with a viscosity of 50 cP at 25° C., endblocked by trimethylsilyl radicals and containing 0.80% by weight of hydrogen atoms bonded to silicon atoms, 30 ppm of platinum based on the weight of B-3 as a reaction product of chloroplatinic acid and tetramethyltetravinylcyclotetrasiloxane and 40 ppm of OIL RED SA EXTRA (tradename, produced by Hakudo Kagaku Kenkyusho) based on the weight of B-3.

When the resulting composition was left to stand in an atmosphere of 50° C., the color thereof turned yellow as the gel cured, and the degree of curing was clearly evaluaed by the change of color. When the thus obtained composition was further tested for adhesiveness to substrates of aluminum, nickel, epoxy resin and phenol resin substrates, the rate of cohesive failure was proved to be 100% in each case.

TABLE 4

| | (in an atmosphere of 50° C.) | | | | |
|---|---|---|---|---|---|
| Time after stirring (minutes) | 20 | 40 | 60 | 75 | 120 |
| Cone penetration ASTM D-1403 | not measurable | 180 | 135 | 100 | 100 |
| Observation by finger touch | — | tacky | tacky | tacky | tacky |
| Color change | red | red | orange | yellow | yellow |

EXAMPLE 5

Component S-5(a) colored blue was prepared by mixing the following materials uniformly; 100 parts of B-1 obtained in Synthesis Example 1, 30 ppm of platinum based on the weight of B-1 as an isopropyl alcohol solution of chloroplatinic acid and 400 ppm of KAYASET BLUE 814 (tradename, produced by Nippon Kayaku Co.).

Component S-5(b) colored red was prepared by adding 0.2 parts of KAYASET RED 802 (tradename, produced by Nippon Kayaku Co.) to 100 parts of linear polymethylhydrogensiloxane with a viscosity of 50 cP at 25° C., endblocked by trimethylsilyl radicals and containing 0.88% by weight of hydrogen atoms bonded to silicon atoms.

To 100 parts of S-5(a) was added 1.0 part of S-5(b), and the resulting mixture turned purple homogeneously upon stirring. Thus, adequacy of the stirring was visually evaluated clearly. When the mixture was left to stand in an atmosphere of 25° C. to effect curing, the color thereof turned from purple to green, and the degree of curing was clearly evaluated by the change in color. The cone penetration measured by means of ASTM D-1403 at the point when the color changed from purple to green was 88 and it was constantly 88 thereafter.

I claim:

1. A polyorganosiloxane composition comprising:
   (A) a linear and/or branched polyorganosiloxane (A), with a viscosity of 50 to 100,000 cP at 25° C., wherein 0.7 to 1.8 silicon-bonded vinyl radicals, on average, are present in each molecule, and the remaining organic radicals bonded to a silicon atom are substituted or unsubstituted monovalent hydrocarbon radicals which do not include unsaturated aliphatic radicals, and 30% or more portion of the molecules have only one silicon-bonded vinyl radical in the molecule;
   (B) a polyorganohydrogensiloxane (B), wherein more than two silicon-bonded hydrogen atoms, on average, are present in each molecule and the remaining organic radicals bonded to a silicon atom are substituted or unsubstituted monovalent hydrocarbon radicals which do not include unsaturated aliphatic radicals, in an amount such that the number of silicon-bonded hydrogen atoms may be 0.5 to 5 per vinyl radical in polyorganosiloxane (A);
   (C) a catalytic amount of platinum compound; and
   (D) a dye selected from the group consisting of anthraquinone dye and azo dye in an amount from 1 to 2,000 ppm based on polyorganosiloxane (A).

2. The composition according to claim 1, wherein vinyl radicals are attached to a terminal silicon atom.

3. The composition according to claim 1, wherein polyorganopolysiloxane (A) is substantially linear.

4. The composition according to claim 1, wherein 40 to 85% of said molecules of said polyorganosiloxane (A) have only one silicon-bonded vinyl radical.

5. The composition according to claim 1, wherein vinyl radicals attached to a silicon atom in each molecule of polyorganopolysiloxane (A) are ranging, on average, from 0.75 to 1.4.

6. The composition according to claim 1, wherein organic radicals attached to a silicone atom in each molecule of polyorganopolysiloxane (A), other than vinyl radicals, are either methyl or phenyl radicals, and phenyl radical content is 50 mole % or less of the total organic radicals.

7. The composition according to claim 1, wherein organic radicals attached to a silicon atom in each molecule of polyorganopolysiloxane (A), other than vinyl radicals, are methyl radicals.

8. The composition according to claim 1, wherein viscosity of polyorganopolysiloxane (A) at 25° C. is ranging from 300 to 5,000 cP.

9. The composition according to claim 1, wherein polyorganopolysiloxane (A) is synthesized by equilibration of vinyl endblocked polyorganosiloxanes, linear and/or branched polyorganosiloxanes without vinyl radicals, and if necessary with cyclic polyorganosiloxanes having no vinyl radicals.

10. The composition according to claim 1, wherein polyorganopolysiloxane (B) is linear polyorganohydrogensiloxane.

11. The composition according to claim 1, wherein organic radicals attached to a silicon atom in each molecule of polyorganohydrogensiloxane (B) are methyl radicals.

12. The composition according to claim 1, wherein the amount of polyorganohydrogensiloxane (B) is such that silicon-bonded hydrogen atoms in polyorganohydrogensiloxane (B) are ranging from 0.8 to 1.8 per silicon-bonded vinyl radical in polyorganosiloxane (A).

* * * * *